(12) United States Patent
Kerstein

(10) Patent No.: US 11,822,649 B2
(45) Date of Patent: Nov. 21, 2023

(54) INTRUSION ANOMALY MONITORING IN A VEHICLE ENVIRONMENT

(71) Applicant: C2A-SEC, LTD., Jerusalem (IL)

(72) Inventor: Roie Kerstein, Beitar Eilit (IL)

(73) Assignee: C2A-SEC, Ltd., Jerusalem (IL)

(*) Notice: Subject to any disclaimer, the term of this patent is extended or adjusted under 35 U.S.C. 154(b) by 203 days.

(21) Appl. No.: 16/960,943

(22) PCT Filed: Dec. 30, 2018

(86) PCT No.: PCT/IL2018/051410
§ 371 (c)(1),
(2) Date: Jul. 9, 2020

(87) PCT Pub. No.: WO2019/142180
PCT Pub. Date: Jul. 25, 2019

(65) Prior Publication Data
US 2020/0342099 A1    Oct. 29, 2020

Related U.S. Application Data

(60) Provisional application No. 62/617,668, filed on Jan. 16, 2018.

(51) Int. Cl.
*G06F 21/55* (2013.01)
*G07C 5/00* (2006.01)
*H04L 9/40* (2022.01)

(52) U.S. Cl.
CPC .......... *G06F 21/554* (2013.01); *G07C 5/008* (2013.01); *H04L 63/1441* (2013.01)

(58) Field of Classification Search
CPC .... G06F 21/554; G07C 5/008; H04L 63/1441
(Continued)

(56) References Cited

U.S. PATENT DOCUMENTS

2013/0204484 A1* 8/2013 Ricci .................. B60W 50/00
                                                      701/29.6
2014/0032800 A1    1/2014 Peirce
(Continued)

FOREIGN PATENT DOCUMENTS

EP    2892202 A1    7/2015
EP    3148236 A1 * 3/2017 ............. G06F 21/35
(Continued)

OTHER PUBLICATIONS

International Search Report for PCT application PCT/IL2018/051410 issued by the EPO dated Apr. 16, 2019.
(Continued)

*Primary Examiner* — Bryan F Wright
(74) *Attorney, Agent, or Firm* — Webb and Co., Ltd.

(57) ABSTRACT

A system for monitoring intrusion anomalies in an automotive environment, the system comprising: a telematic control unit; a plurality of engine control units, each of the plurality of engine control units associated with a local security monitor and a diagnostic communications manager arranged to receive information regarding intrusion anomalies detected by the local security monitor; and an anomaly analyzer in communication with each of the diagnostic communication managers and the telematics control unit, the communication utilizing a diagnostic over Internet protocol, the anomaly analyzer arranged to aggregate the information regarding intrusion anomalies detected by the respective local security monitors.

22 Claims, 9 Drawing Sheets

(58) Field of Classification Search
  USPC .......................................................... 726/23
  See application file for complete search history.

(56) References Cited

U.S. PATENT DOCUMENTS

| | | | |
|---|---|---|---|
| 2015/0195297 A1 | 7/2015 | Ben Noon | |
| 2016/0219028 A1* | 7/2016 | Baltes | H04L 63/0227 |
| 2017/0070320 A1* | 3/2017 | Choi | H04L 67/12 |
| 2017/0104631 A1* | 4/2017 | Chae | H04L 67/56 |
| 2017/0147812 A1* | 5/2017 | Ujiie | H04L 63/20 |
| 2017/0200323 A1 | 7/2017 | Allouche | |
| 2017/0295188 A1* | 10/2017 | David | H04L 63/101 |
| 2018/0232959 A1* | 8/2018 | Thornburg | H04L 43/0805 |
| 2019/0079842 A1* | 3/2019 | Chae | G06F 11/3006 |
| 2019/0182267 A1* | 6/2019 | Aher | H04L 67/12 |
| 2020/0053113 A1 | 2/2020 | Sasaki | |

FOREIGN PATENT DOCUMENTS

| | | | |
|---|---|---|---|
| EP | 3148236 A1 | 3/2017 | |
| WO | WO-2016151566 A1 * | 9/2016 | G06F 21/554 |

OTHER PUBLICATIONS

Written Opinion of the International Search Report for PCT application PCT/IL2018/051410 issued by the EPO dated Apr. 16, 2019.
Armin R Wasicek et al., "Context-Aware Intrusion Detection in Automotive Control Systems", 5th ESCAR USA, Jun. 21, 2017, XP055577336.

* cited by examiner

INTRUSION ANOMALY MONITORING IN A VEHICLE ENVIRONMENT

CROSS-REFERENCE TO RELATED APPLICATIONS

The present application claims priority from U.S. provisional patent application Ser. 62/617,668, filed Jan. 16, 2018 and entitled "SOFT ERROR CONTROL IN A VEHICLE ENVIRONMENT", the entire contents of which are incorporated herein by reference.

TECHNICAL FIELD

The invention relates generally to the field of security devices, and more specifically a system and method for monitoring intrusion anomalies in an automotive environment.

BACKGROUND

The number of electronic devices being installed in-vehicles is rapidly increasing. In the past, electronic devices in automobiles were discrete devices handling a particular function, operating in a stand-alone environment. In the 1980's it was recognized that there would be a need to develop a network operating standard for vehicles, and the controller area network (CAN) bus was born.

Over time the number of interconnected devices utilizing a CAN bus has rapidly increased. These interconnected devices may control driving features, such as engine speed, braking control and steering control, as well as comfort features such as lighting, windows and sun-roof controls.

A further development has been the expansion of the Internet, and the ever growing demand for wireless access to the Internet. The expansion of cellular telephones and wireless Internet access ensures that in the future vehicles will be connected to external networks. In the recent past, access to the vehicle was restricted to the use of a dedicated service cable, and the only wireless access was for a radio delivering news and music. Today, an integrated infotainment system is being provided that delivers to the vehicle both entertainment and information content.

As the number of electronic devices in-vehicles have multiplied, a number of automotive manufacturers have agreed upon an open standard software architecture for automotive electronic control units (ECUs). Presently, the AUTOSAR consortium of Munich, Germany has released version 4.3 of the Autosar Classic Platform. Autosar compliant diagnostics are designed to detect actual failures, or defects, in one or more ECUs. The diagnostics use a particular communication protocol designated "Diagnostics over Internet Protocol" (DoIP), which is designed for communication between a test equipment and an ECU via an on-board Ethernet switch. DoIP is a transparent protocol, and does not involve translation between the test equipment and the ECU. DoIP is defined in ISO 13400, Part 2, published by the International Organization for Standardization, Geneva, Switzerland. DoIP facilitates diagnostics related communication between external test equipment and automotive ECUs using IP, TCP and UDP. A diagnostic communication manager (DCM) within the ECU communicates with the test equipment, transferring the relevant pre-defined diagnostic trouble code (DTC) defined by the automotive manufacture which is representative of an identified failure in the respective ECU.

FIG. 1 illustrates a high level block diagram of an automotive communication network 10 known to the prior art comprising: an Ethernet switch 20; a plurality of ECUs 30; a telematic control unit (TCU) 40; an external tester 50; a DoIP client 70; a domain controller unit (DCU) 80; a DoIP gateway 85; a controller area network (CAN) bus 90; and a plurality of CAN ECUs 95. Each of the plurality of ECUs 30, TCU 40, DoIP client 70, DCU 80 and DoIP gateway 85 are coupled to a respective port of Ethernet switch 20. In another embodiment, DoIP gateway 85 is implemented within DCU 80. External tester 50 is pluggably coupled to a respective port of Ethernet switch 20. DCU 80, acting as a CAN gateway, is further connected to CAN bus 90, and each CAN ECU 95 is coupled to CAN bus 90.

External tester 50 may be physically coupled to the respective port of Ethernet switch 20 via a tester plug and matching receptacle, or may be accessible by a wireless connection, such as a Bluetooth connection or wireless Internet, without limitation. DCU 80 acts as a gateway controller between CAN bus 90 and Ethernet switch 20. DoIP gateway 85 translates DoIP requests received from external tester 50 into commands understood by each ECU 30, TCU 40 and/or CAN ECU 95. Although DoIP gateway 85 is illustrated as being coupled between Ethernet switch 20 and CAN BUS 90, an additional DoIP gateway may be provided within Ethernet switch 20. In another embodiment, as described above, DoIP gateway 85 is implemented within DCU 80. Additionally, external tester 50 can send DoIP requests directly to any ECU which has a dedicated DoIP node. DoIP client 70 is arranged to receive from different vendors software images for over the air (OTA) software updates of ECU 30 and operates by imitating external tester 50, which external tester 50 is used by technicians to update the firmware of the target ECU 30. The software images are received by DoIP client 70 over a proprietary protocol, such as TCP/IP. Optionally, a DoIP node (not shown) is further provided which serves as a target for DTCs generated by any of ECU 30, TCU 40 and/or CAN ECU 95. Typically, the DoIP node further comprises a memory arranged to store the received DTCs for retrieval by external tester 50. TCU 40 comprises: a global positioning system (GPS) unit, which is arranged to identify location information for the vehicle; an external interface for mobile communication (such as GSM, GPRS, Wi-Fi, WiMax or LTE), which enable communication with a database server located at a remote site, a mobile communication unit comprising an antenna arranged to perform communication with the remote site; a controller, such as a microprocessor or field programmable gate array; and a local memory.

There is no requirement that DoIP client 70 or DoIP gateway 85 be provided, and each ECU 30, TCU 40 and/or CAN ECU 95 may be arranged with an appropriate DoIP node, or stack, which is arranged to communicate the DTCs to external tester 50, and may provide an on-board memory to store the DTCs without exceeding the scope. A DoIP node implements the transport layer of DoIP in accordance with the relevant layer standard.

The arrangement of automotive communication network 10 thus enables the generation of hardware faults discovered by each of the respective ECU 30, TCU 40 and/or CAN ECU 95, however it does not provide a mechanism for detecting, reporting on, or acting upon, anomalies in packets prior to receipt by any of ECU 30, TCU 40 and/or CAN ECU 95, known hereinafter as network intrusion anomalies, which are anomalies associated with an attempt by an attacker to intrude into the network. Nor does it provide for a mechanism for detecting, reporting on, or acting upon, anomalies in an ECU based on using statistics or machine learning, known hereinafter as local intrusion anomalies, which are anomalies associated with an attempt by an attacker to intrude into an ECU. The term 'intrusion anomaly', as used herein, is defined as an anomaly associated with an attempt by an attacker to intrude on any portion of the automotive communication network. This includes, but is not limited to: statistical anomalies in the data being transmitted over the network, e.g. a distributed denial of service (DDOS) attack, as will be described below; attempts to spoof a MAC address of an ECU; subscription requests from IP of PORT; incorrect values in SOME/IP information; signals which deviate from a pre-defined model or rule; stack overflows; and return-oriented programming attacks. Additionally, no mechanism is provided for vehicle to vehicle DoIP communication, thus vehicles cannot share DTCs with each other.

SUMMARY OF THE INVENTION

Accordingly, it is a principal object of the present invention to overcome at least some of the disadvantages of prior art bus control methods and systems. This is provided in one embodiment by providing a system for monitoring intrusion anomalies in an automotive environment, the system comprising: a telematic control unit; a plurality of engine control units, each of the plurality of engine control units associated with a respective local security monitor and a diagnostic communications manager arranged to receive information regarding intrusion anomalies detected by the local security monitor; and an anomaly analyzer in communication with each of the diagnostic communication managers and the telematics control unit, the communication utilizing a diagnostic over Internet protocol, the anomaly analyzer arranged to accumulate the information regarding intrusion anomalies detected by the respective local security monitors.

In one embodiment, the anomaly analyzer is further arranged to compare the received information regarding intrusion anomalies detected by the local security monitor with a black list, and in the event that the received information is congruent with the black list, output at least one of: a command to disable a communication function of the telematics control unit; and an alert message. In one further embodiment, the system further comprises an anomaly monitor in communication with the anomaly analyzer, the alert message being sent to the anomaly monitor, wherein the plurality of engine control units, the anomaly analyzer and the anomaly monitor are located within a single automotive environment.

In another further embodiment, the system further comprises an anomaly monitor, the alert message being sent to the anomaly monitor, wherein: the plurality of engine control units and the anomaly analyzer are located within a single automotive environment; and the anomaly monitor is remote from the single automotive environment and in communication with the anomaly analyzer through the telematic control unit. In one yet further embodiment, the anomaly monitor is in communication with a plurality of anomaly analyzers, each of the anomaly analyzers within a respective single automotive environment. In another yet further embodiment, the anomaly monitor is in communication with a plurality of anomaly analyzers, each of the anomaly analyzers within a respective single automotive environment, the anomaly monitor within a respective supervisory automotive environment.

In one embodiment, each of the plurality of engine control units is within a respective single automotive environment, the anomaly analyzer being within a respective supervisory automotive environment. In another embodiment, the plurality of engine control units are arranged as nodes on a network, the system further comprising a network security monitor arranged to identify anomalies in software packets transmitted on the network to, or from, at least one of the plurality of engine control units, the anomaly analyzer further in communication with the anomaly analyzer utilizing the diagnostic over Internet protocol.

In one embodiment, each of the diagnostic communication managers are arranged to report on event, to the anomaly analyzer, the intrusion anomalies identified by the respective security monitor. In another embodiment, the anomaly analyzer is arranged to periodically poll each of the diagnostic communication managers for the intrusion anomalies identified by the respective security monitor.

In one embodiment, each of the plurality of engine control units further comprises a diagnostic event manager arranged to generate a diagnostic anomaly code for each of the intrusion anomalies detected by the security monitor, the diagnostic communications manager in communication with the diagnostic event manager thereby receiving the information regarding anomalies detected by the security monitor. In one further embodiment, for each type of the intrusion anomalies detected by the security monitor the diagnostic event manager is arranged to generate a unique diagnostic anomaly code.

In another embodiment, the anomaly analyzer comprises a diagnostic over Internet protocol client, and the plurality of engine control units each comprise a diagnostic over Internet protocol node, for the communication utilizing the diagnostic over Internet protocol.

In one independent embodiment, a method of monitoring intrusion anomalies in an automotive environment, the method comprising: detecting intrusion anomalies for each of a plurality of engine control units; receiving information, at a respective diagnostic communications manager associated with the respective engine control unit, regarding the detected intrusion anomalies; and communicating, utilizing a diagnostic over Internet protocol, the received information to an anomaly analyzer, the anomaly analyzer arranged to accumulate the detected intrusion anomalies of the plurality of engine control units.

In one embodiment, the method further comprises: comparing the received information with a black list; and in the event that the received information is congruent with the black list, output at least one of: a command to disable a communication function of the telematics control unit; and an alert message. In one further embodiment, the alert message is sent to an anomaly monitor, the plurality of engine control units, the anomaly analyzer and the anomaly monitor located within a single automotive environment. In another further embodiment, the alert message is sent to an anomaly monitor, wherein: the plurality of engine control units and the anomaly analyzer are located within a single automotive environment; and the anomaly monitor is remote from the single automotive environment.

In one yet further embodiment, the anomaly monitor is in communication with a plurality of anomaly analyzers, each of the anomaly analyzers within a respective single automotive environment. In another yet further embodiment, the anomaly monitor is in communication with a plurality of anomaly analyzers, each of the anomaly analyzers within a respective single automotive environment, the anomaly monitor within a respective supervisory automotive environment.

In one embodiment, the detecting intrusion anomalies comprises identifying intrusion anomalies in software packets transmitted to, or from, at least one of the plurality of engine control units. In another embodiment, the method further comprises setting each of the diagnostic communication managers to report on event, to the anomaly analyzer, the detected intrusion anomalies.

In one embodiment, the method further comprises periodically polling each of the diagnostic communication managers for the detected intrusion anomalies. In another embodiment, the method further comprises generating a diagnostic anomaly code for each of the detected intrusion anomalies, the received information comprising the generated diagnostic anomaly code. In one yet further embodiment, for each type of detected intrusion anomaly the generated diagnostic anomaly code is unique.

In another independent embodiment, a system for monitoring intrusion anomalies in an automotive environment is provided, the system comprising: a plurality of engine control units arranged as nodes on a network; a network security device comprising a network security monitor arranged to identify anomalies in software packets transmitted on the network to, or from, at least one of the plurality of engine control units; and an anomaly analyzer in communication with the network security monitor, the communication utilizing a diagnostic over Internet protocol, the anomaly analyzer arranged to compare the received information regarding intrusion anomalies detected by the network security device with a black list, and in the event that the received information is congruent with the black list, output at least one of: a command to disable a communication function of the telematics control unit; and an alert message.

In one embodiment, the network security device further comprises a diagnostic communications manager arranged to report on event, to the anomaly analyzer, the information regarding intrusion anomalies detected by the network security monitor. In another embodiment, the plurality of engine control units each comprise a local security monitor and a diagnostic communications manager arranged to receive information regarding intrusion anomalies detected by the local security monitor, wherein the anomaly analyzer is further in communication with each of the diagnostic communication managers of the engine control units utilizing the diagnostic over Internet protocol, the anomaly analyzer arranged to accumulate the information regarding intrusion anomalies detected by the respective local security monitors.

In one further embodiment, the anomaly analyzer is further arranged to: compare the received information regarding intrusion anomalies from the diagnostic communication managers of the engine control units with the black list, and in the event that the received information regarding intrusion anomalies from any of the diagnostic communication managers is congruent with the black list, output at least one of: the command to disable a communication function of the telematics control unit; and the alert message.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how several forms of the invention may be embodied in practice. In the accompanying drawings.

DETAILED DESCRIPTION OF THE PREFERRED EMBODIMENTS

Figure 1:
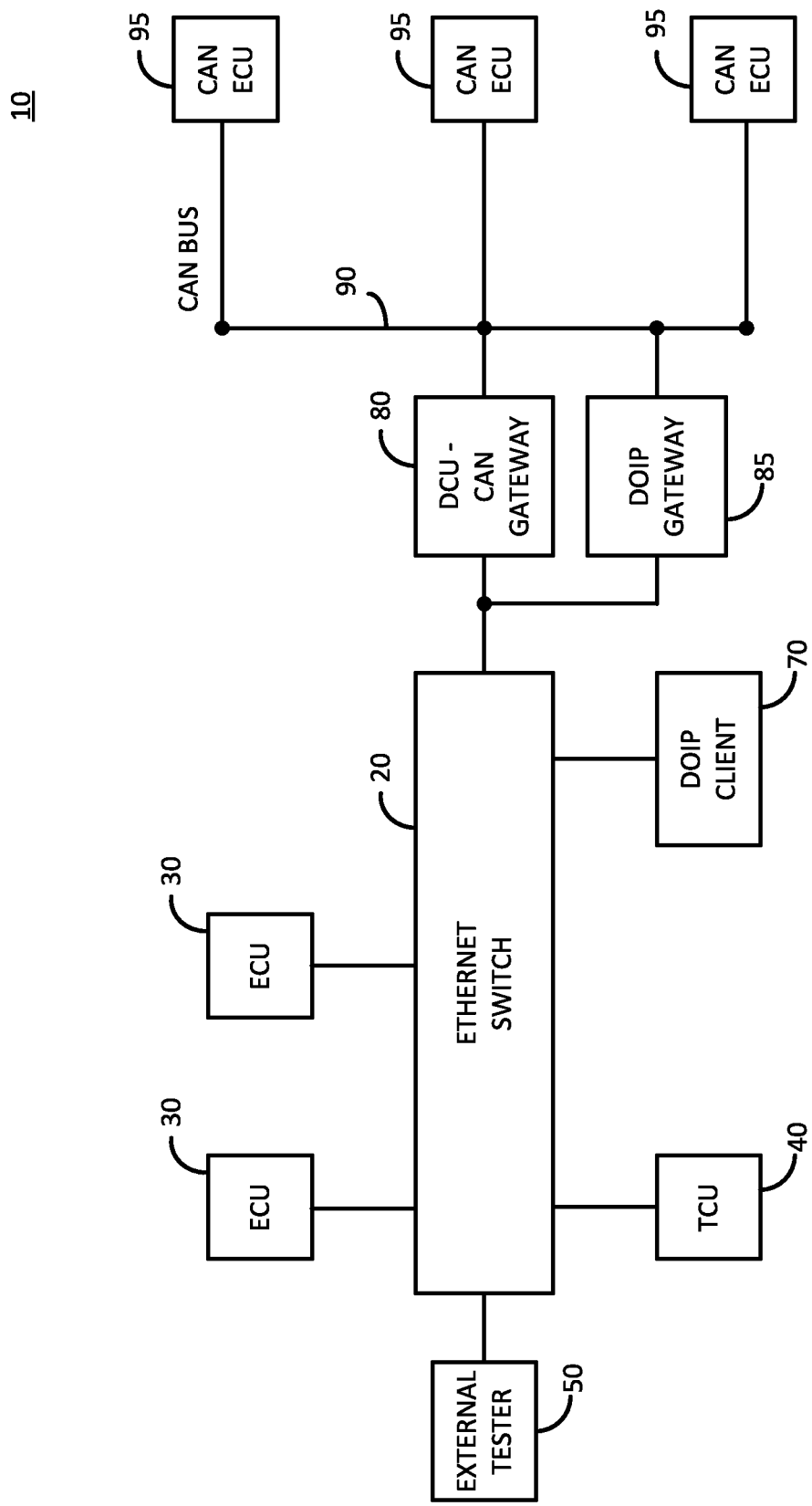
FIG. 1 illustrates a high level block diagram of an automotive communication network known to the prior art.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Various embodiments are described herein in relation to a CAN bus, however this is not meant to be limiting in any way, the embodiments herein are equally applicable to any bus architecture. The embodiments herein are described in relation to an unsecured device being an infotainment system, however this is not meant to be limiting in any way. For example, it is envisioned that in the future a direct Internet connection module may be provided for updating vehicle software, and such an Internet connection module may be considered an unsecured device. Similarly, an OBD2 (on-board diagnostics V2) connection may expose the vehicle to an unsecured device.

Operation is herein described primarily in an Autostrar environment, however this is not meant to be limiting in any way. The principles taught herein are equally applicable to other vehicle environments, including Linux environments, without exceeding the scope.

Figure 2A:
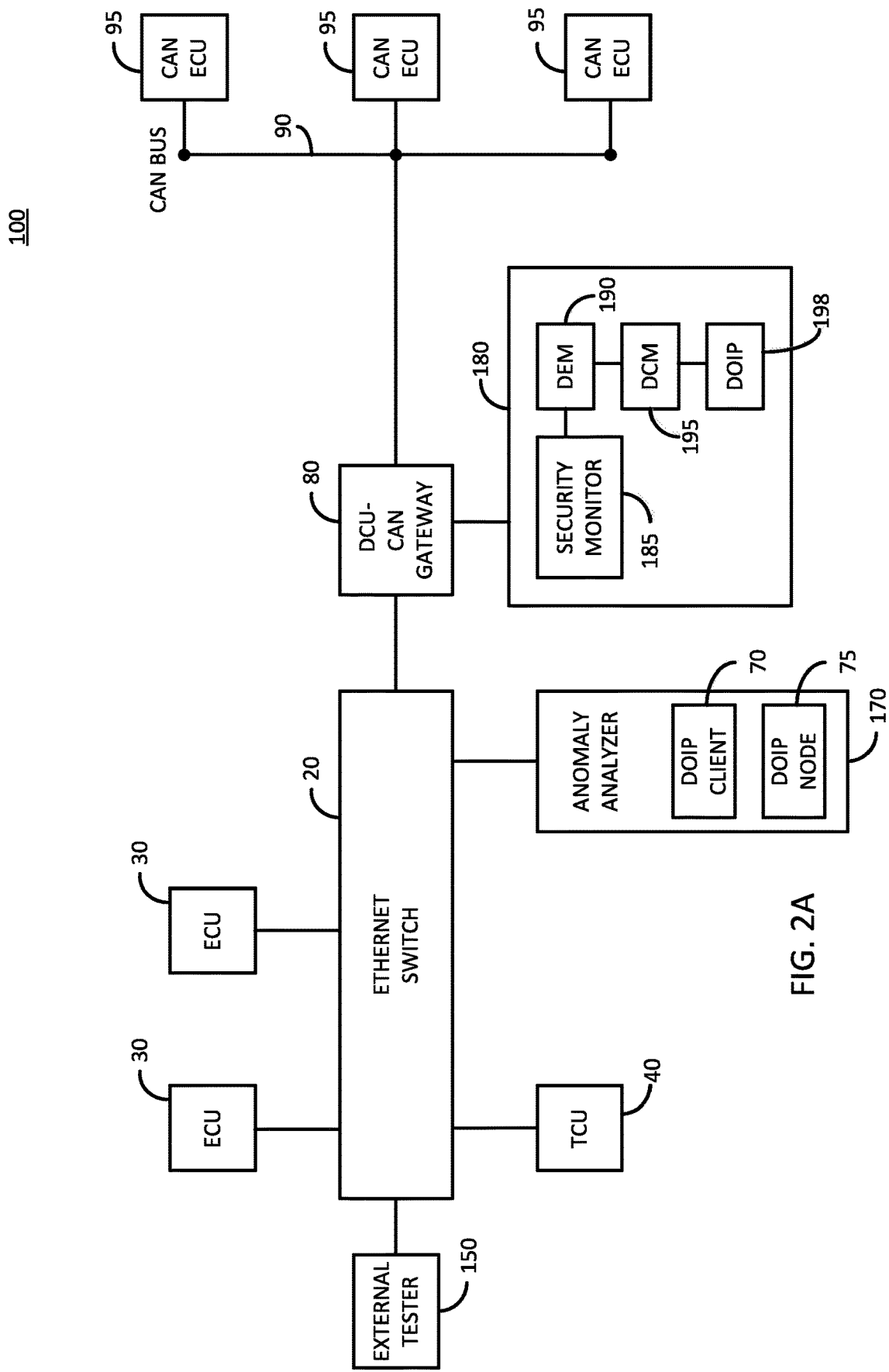
FIG. 2A illustrates an automotive communication network comprising a network security monitor.

FIG. 2A illustrates an automotive communication network 100 comprising a network security device 180 in communication with DCU 80. In further detail, automotive communication network 100 comprises: Ethernet switch 20; plurality of ECUs 30; TCU 40; an external tester 150; an anomaly analyzer 170 comprising a DoIP client 70 and a DoIP node 75; DCU 80; a network security device 180; a CAN bus 90; and plurality of CAN ECUs 95. Each of the plurality of ECUs 30, TCU 40, anomaly analyzer 170 and DCU 80 are coupled to a respective port of Ethernet switch 20 and represent nodes of automotive communication network 100. External tester 150 is pluggably coupled to a respective port of Ethernet switch 20. DCU 80, acting as a CAN gateway, is further connected to CAN bus 90, and each CAN ECU 95 is coupled to CAN bus 90. Network security device 180 is in communication with DCU 80, and may be incorporated therein without exceeding the scope. One embodiment of network security device 180 is described in co-pending PCT application IL2017/050868 entitled "Data Bus Protection Device and Method", the entire content of which is incorporated herein by reference. Network security device 180 comprises: a network security monitor 185; a diagnostic event manager (DEM) 190; a diagnostic communication manager (DCM) 195; and a DoIP node 198.

External tester 150 may be physically coupled to the respective port of Ethernet switch 20 via a tester plug and matching receptacle, or may be accessible by a wireless connection, such as a Bluetooth connection or wireless Internet, without limitation. DCU 80 acts as a gateway controller between CAN bus 90 and Ethernet switch 20. Anomaly analyzer 170 is arranged, as will be described further below, to request from the various ECUs 30, CAN ECUs 95 and DCU 80 DTCs and diagnostic anomaly codes (DACs), and in certain conditions perform a protective action responsive thereto. The term DAC, as used herein, is meant as a code which indicates an anomaly which deviates from the proper configuration. As opposed to DTCs, DACs provide anomaly codes for complex anomalies, such as security flaws, safety flaws and hacking identification, as will be described further below.

Anomaly analyzer 170 further serves as a target for DTCs generated by any of ECU 30, TCU 40, CAN ECU 95, and/or a DAC generated by network security device 180. Anomaly analyzer 170 typically further comprises a memory (not shown) arranged to store the received DTCs/DACs for retrieval by external tester 50, and further comprises a processor arranged to analyze the received DTCs/DACs, and in certain circumstances take protective action responsive thereto, as will be described further below.

In operation, network security monitor 185 of network security device 180 monitors activity on CAN bus 90, either by snooping for, or by actively blocking, a message addressed to any CAN ECU 95. In particular, in one embodiment each received message addressed to any CAN ECU 95 is snooped and the source address and target address of the snooped message are compared to a predetermined list of acceptable addresses to determine validity. In another embodiment, each received message addressed to any CAN ECU 95 is snooped, and the packet of the snooped message is analyzed statistically to determine any anomalies in the message. In another embodiment, as described in the above mentioned PCT/IL2017/050868, the message is encapsulated and only released in the event that it is determined to be valid. In any event of determination of an invalid message, network security monitor 185 generates a DAC, which is transmitted to anomaly analyzer 170 as will be described further below.

While network security device 180 is shown as being coupled to DCU 80, this is not meant to be limiting in any way. In the embodiment shown, Ethernet switch 20 is preferably programmed to transmit towards network security device 180 a copy of all messages traversing Ethernet switch 20, so that the message is visible to network security monitor 185 for snooping. In an alternative embodiment, network security device 180 is coupled to a respective port of Ethernet switch 20, and Ethernet switch 20 is preferably programmed to transmit towards network security device 180 a copy of all messages traversing Ethernet switch 20. In yet another embodiment a first instance of network security device 180 is coupled to DCU 80 and a second instance of network security device 180 is coupled to a respective port of Ethernet switch 20.

Upon detection of a intrusion anomaly, network security monitor 185 signals DEM 190 with information regarding the detected intrusion anomaly. DEM 190, responsive to the signaled detected intrusion anomaly, generates a DAC reflecting the detected intrusion anomaly and transmits the generated DAC to DCM 195. In one embodiment, DEM 190 generates one of a plurality of DACs, each indicative of a particular potential intrusion anomaly that may be detected by network security monitor 185. In another embodiment, a single DAC is provided by DEM 190, with a payload carrying information indicative of the particular intrusion anomaly detected by network security monitor 185. As described above, such intrusion anomalies include, but are not limited to, security and safety anomalies, including statistical anomalies and anomalies detected through machine learning. For example, network security monitor 185 can detect a distributed denial of service (DDOS) attack. Such an attack would not constitute an anomaly associated with a standard DTC because each access attempt is proper. Only when detecting an accumulation of access attempts is the DDOS attack detected by network security monitor 185 and an appropriate DAC is generated. Other examples include, without limitation: detection of an attempt to spoof the MAC address of an ECU 30; subscription requests from IP or PORT; and incorrect values in SOME/IP information. In one embodiment, a machine learning algorithm is used to compare correlation of signals with a pre-defined model. In the event that the signals deviate from the pre-defined model, an anomaly is indicated and an appropriate DAC is generated, including relevant information regarding the anomaly.

Figure 3A:
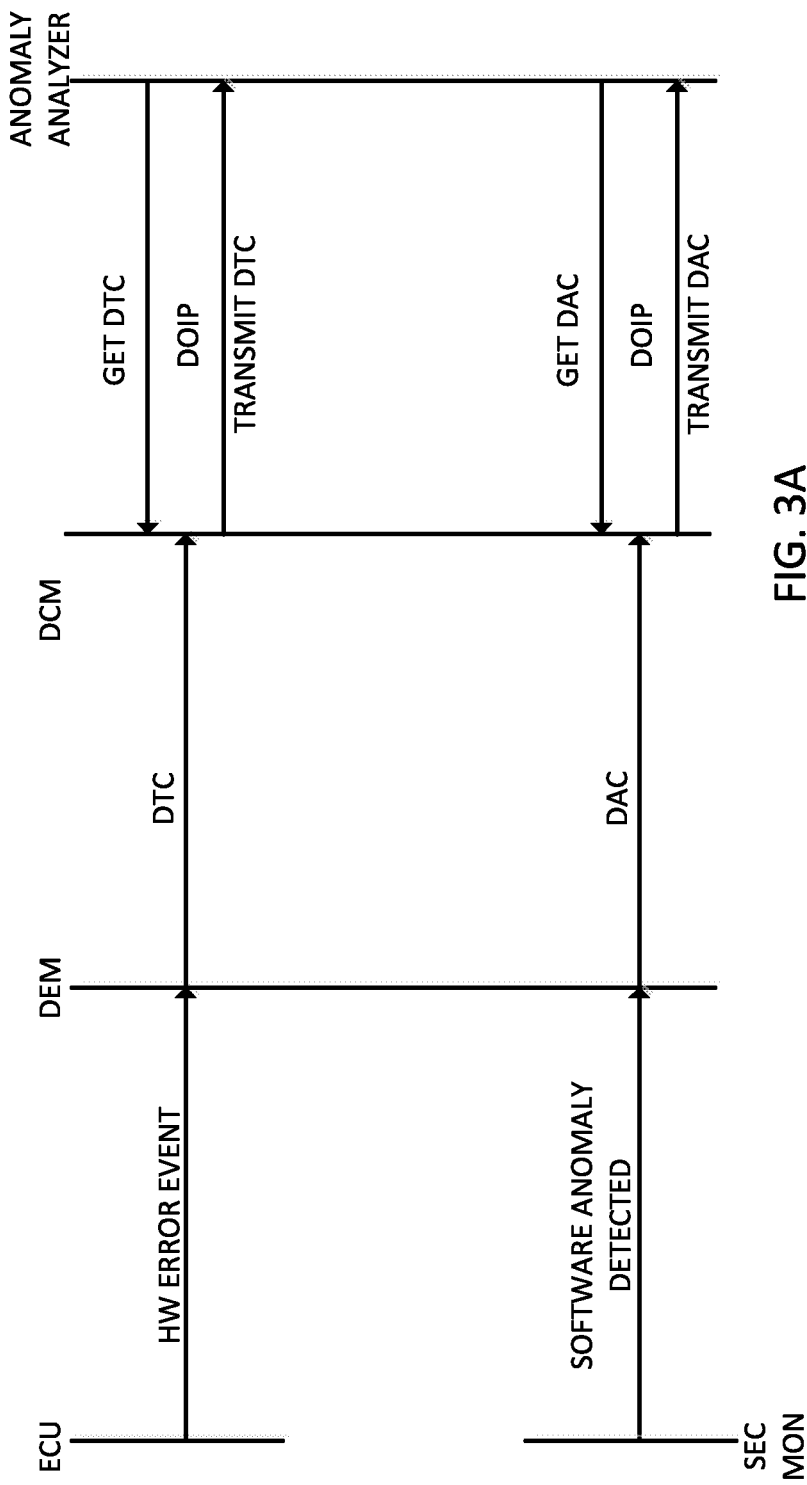
FIG. 3A illustrates a pull mode flow chart, where an anomaly analyzer is arranged to query a domain controller module and obtain relevant information regarding detected intrusion anomalies.

Referring now to FIG. 3A, a high level pull mode flow chart is illustrated describing the flow of information from network security device 180 to anomaly analyzer 170. As each hardware event is noted by ECU 30, the event is notified to DEM 190. As each intrusion anomaly is detected by security monitor 185, the anomaly is notified to DEM 190. Periodically, DoIP client 70 of anomaly analyzer 170 requests from network security device 180 all accumulated DACs, and DCM 195 of network security device 180 responds with all accumulated DACs held by DCM 195 transmitted utilizing DoIP implemented by DoIP node 198. Periodically, DoIP client 70 of anomaly analyzer 170 requests from network security device 180 all accumulated DTCs, and DCM 195 of network security device 180 responds with all accumulated DTCs held by DCM 195 transmitted utilizing DoIP implemented by DoIP node 198.

In one embodiment, client DoIP of anomaly analyzer 170 requests from network security device 180 all accumulated DTCs and DACs in a single request. DCM 195 then clears its local memory to accumulate future DACs and DTCs generated by DEM 190. External tester 150 may similarly periodically send a request to DoIP node 75 of anomaly analyzer 170 for all accumulated DACs and DTCs generated by the respective ECUs 30; network security device 180; TCUs 40 and CAN ECUs 95. Upon transmission of the accumulated DACs and DTCs, anomaly analyzer 170 may optionally clear its associated memory of the transmitted DACs and DTCs. Advantageously, anomaly analyzer 170 is further arranged to analyze the received DACs and DTCs, and in certain conditions take protective action responsive thereto, as described further below.

Figure 3B:
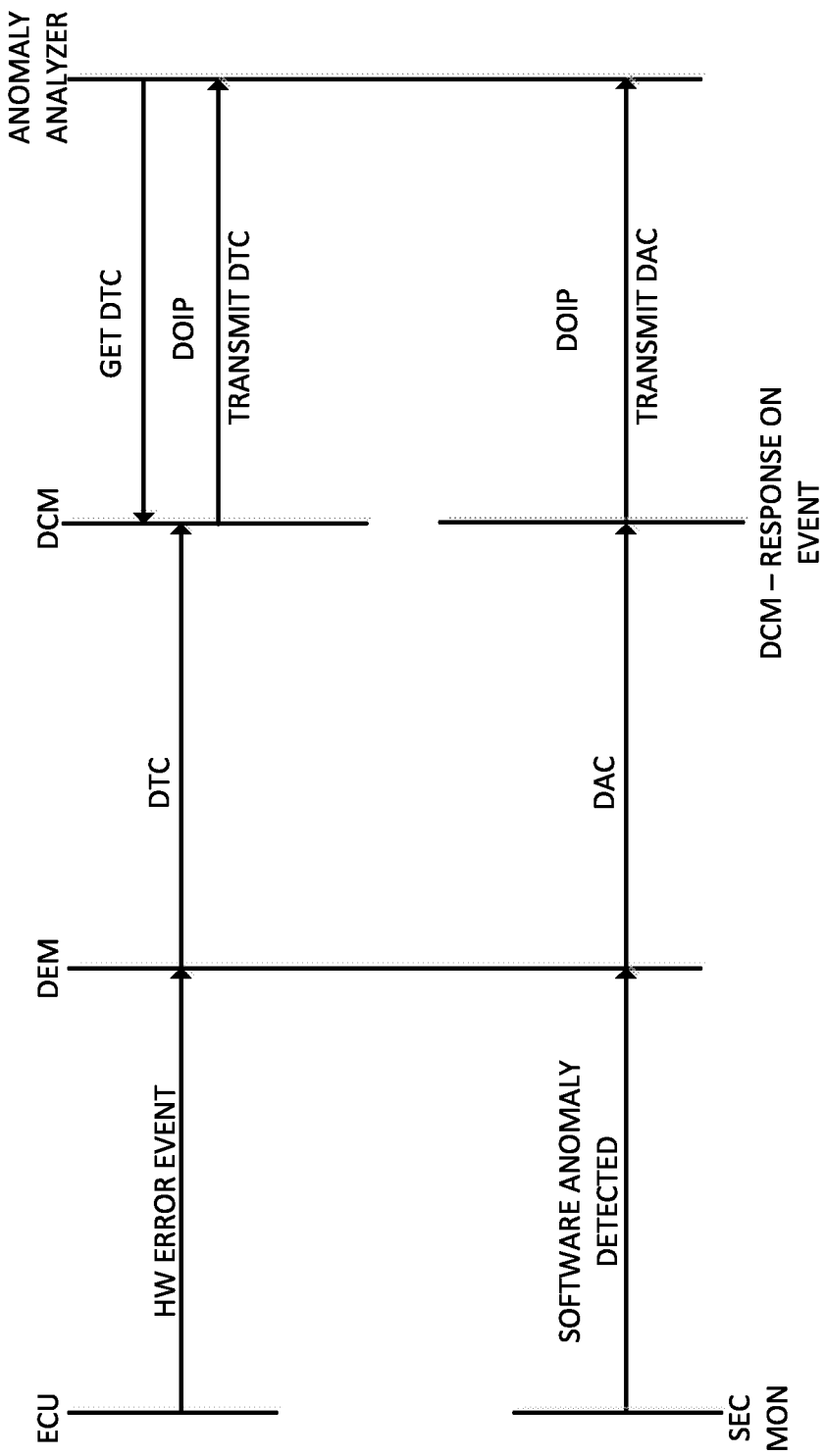
FIG. 3B illustrates a push mode flow chart, where a domain controller module outputs to an anomaly analyzer relevant information regarding detected intrusion anomalies.

Referring now to FIG. 3B, a high level push mode flow chart is illustrated describing the flow of information from network security device 180 to anomaly analyzer 170. As each hardware event is noted by ECU 30, the event is notified to DEM 190. As each intrusion anomaly is detected by security monitor 185, the anomaly is notified to DEM 190. Anomaly analyzer 170 generates a command to DCM 185 of network security device 180, which command sets DCM 185 to response on event mode for all reported DACs received from DEM 190. Thus, a channel is continuously opened between DoIP node 198 and anomaly analyzer 170, and responsive to the DAC generated by DEM 190, DCM 195 transmits the received DAC to anomaly analyzer 170. In such an embodiment, DCM 195 may not require a local memory to accumulate future DACs generated by DEM 190. Periodically, DoIP client 70 of anomaly analyzer 170 requests from network security device 180 all accumulated DTCs, and DCM 195 of network security device 180 responds with all accumulated DTCs held by DCM 195 transmitted utilizing DoIP implemented by DoIP node 198. DCM 195 then clears its local memory to accumulate future DTCs generated by DEM 190.

External tester 150 may periodically request from anomaly analyzer 170 all accumulated DACs and DTCs generated by the respective ECUs 30; network security device 180; TCUs 40 and CAN ECUs 95. Upon transmission of the accumulated DACs and DTCs, anomaly analyzer 170 may optionally clear its associated memory of the transmitted DACs and DTCs. Additionally, anomaly analyzer 170 is further arranged to be in communication with a remote server via TCU 40, and the remote server may periodically request from anomaly analyzer 170 all accumulated DACs and DTCs generated by the respective ECUs 30; network security device 180; TCUs 40 and CAN ECUs 95.

Figure 3C:
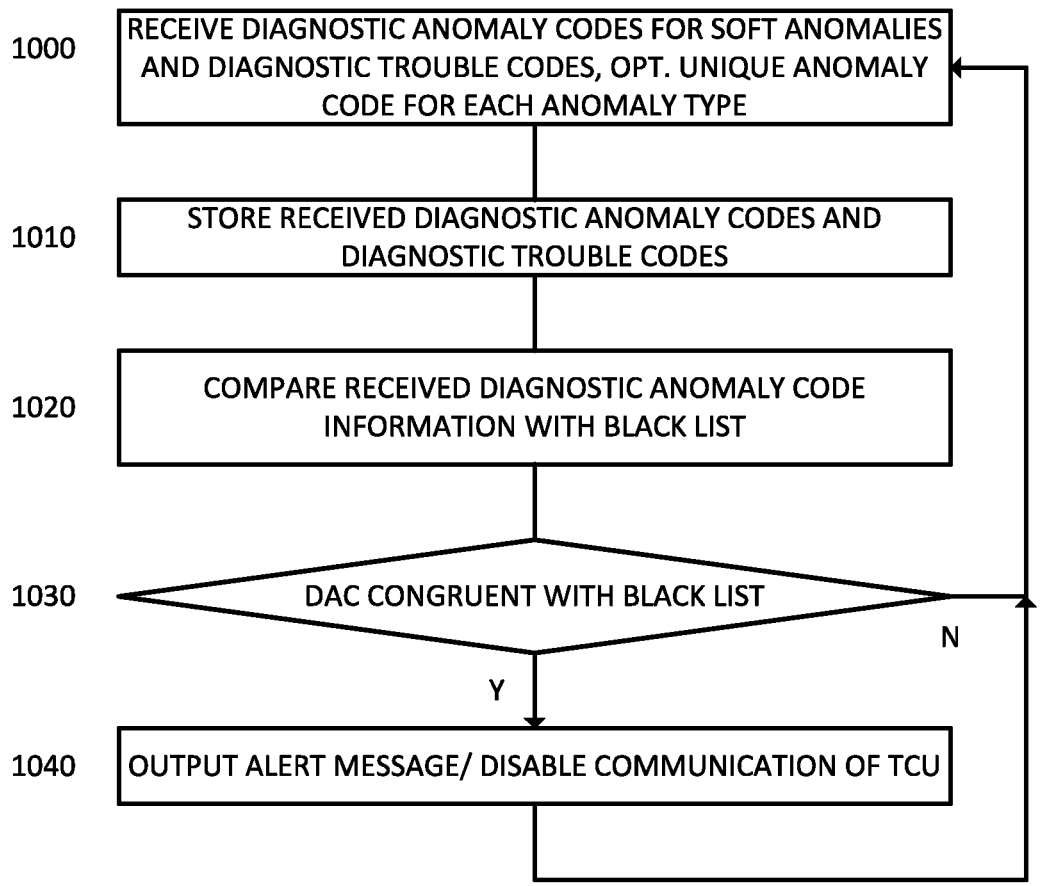
FIG. 3C illustrates a high level flow chart of the operation of the anomaly analyzer.

FIG. 3C illustrates a high level flow chart of the operation of anomaly analyzer 170 in connection with any of FIGS. 3A, 3B. Anomaly analyzer 170 may be implemented in an FPGA, microcontroller, or processor with associated memory, the associated memory holding electronically readable instructions, which when implemented perform the tasks as described. In stage 1000, the DACs and DTCs generated by the respective ECUs 30; network security device 180; TCUs 40 and CAN ECUs 95 are received. As indicated above, DACs are associated with intrusion anomalies, and DTC are associated with hardware anomalies. Optionally, as described above, for each type of intrusion anomaly, a unique DAC is generated. In stage 1010, the received DACs and DTCs of stage 1000 are stored on a respective memory associated with anomaly analyzer 170.

In stage 1020, the received DACs are compared with a black list, stored on respective memory locations associated with anomaly analyzer 170. There is no requirement that the actual DACs be compared with the black list, and in another embodiment the payload information of the received DACs are compared with the black list. The comparison is not meant to be limited to a direct item by item comparison, and identification of a range of values, or a translation of values may be utilized without exceeding the scope.

In stage 1030 the result of the comparison of stage 1020 is identified. In the event that any of the received DACs of stage 1000, or payload information thereof, are congruent with the black list of stage 1020, in stage 1040 anomaly analyzer 170 is arranged to output a warning indicator to a monitor, as will be described further below, and optionally disable the communication function of TCU 40. In one particular embodiment, the communication function of TCU 40 is disabled by utilizing a Unified Diagnostic Services (UDS) protocol message as defined in ISO 14229-1. In this particular embodiment, anomaly analyzer 170 uses a service 0x31 request over UDS with TCU 40 as a target of the message to modify the state of TCU 40 so as to block any incoming request. The term congruent is meant to include where the information is found on the black list, is in the range of values found on the black list, or where through a predetermined transformation the received DAC, or payload information thereof, matches any item on the black list. Each item on the black list may have an associated flag indicating whether a warning indicator is to be sent and/or communication is to disabled. In an alternate embodiment, a plurality of black lists are provided each with an associated action, or actions.

In the event that in stage 1030 none of the received DACs of stage 1000, or payload information thereof, are found on the black list of stage 1020, or after the operation of stage 1040, stage 1000 is again performed.

DACs may also be generated by TCU 30. In accordance to the teachings herein, TCU 30 may be implemented with a security monitor 185 embedded therein (not shown). In such an embodiment, in the event that an anomaly is detected in activity of the GPS unit, a respective DAC may be generated and received by anomaly analyzer 170 via DoIP.

Figure 2B:
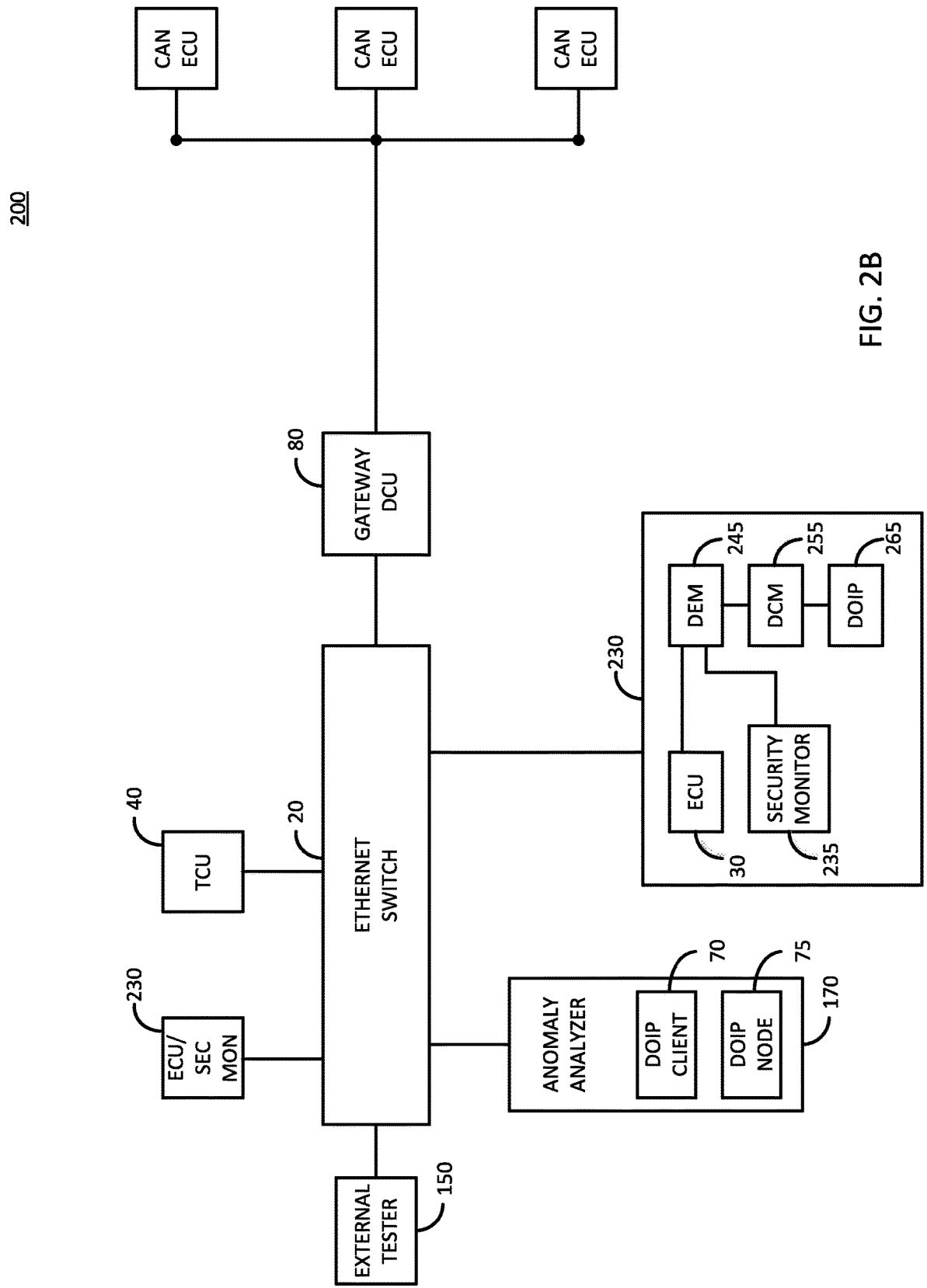
FIG. 2B illustrates an automotive communication network wherein at least one ECU comprises a local security monitor.

FIG. 2B illustrates an automotive communication network 200 wherein at least one advanced ECU 230 comprises a local security monitor 235. In further detail, automotive communication network 200 comprises: Ethernet switch 20; at least one advanced ECU 230; external tester 150; and anomaly analyzer 170. Optionally, automotive communication network 200 may further comprise: DCU 80; network security device 180 (not shown for simplicity); CAN bus 90; CAN ECUs 95; ECU 30 (not shown for simplicity); and TCU 40. While advanced ECU 230 is being described in further detail, it is to be understood that a similar arrangement may be implemented for a TCU without exceeding the scope.

Advanced ECU 230 comprises: a local security monitor 235; a DEM 245; a DCM 255; and a DoIP node 265, implementing the DoIP transport layer. Additionally, ECU 230 comprises other standard components of prior art ECU 30 (not shown for simplicity). In an exemplary embodiment, local security monitor 235, DEM 245, DCM 255 and DoIP node 265 are implemented as software modules within advanced ECU 230.

In operation, and in accordance with the prior art, ECU 230 performs an automotive operation, and monitors its local hardware for proper operation, as known to those skilled in the art at the time of the invention as performed by the standard components of prior art ECU 30. In the event of an anomaly in the normal operation of ECU 230, ECU 230 signals DEM 245 with information regarding the detected anomaly, and responsive thereto, DEM 245 generates a DTC associated with the particular anomaly signaled by ECU 230. DEM 245 transmits the generated DTC to DCM 255, which stores the generated DTC for recall by external tester 150 or anomaly analyzer 170. In particular, periodically external tester 150 or anomaly analyzer 170 may send a get DTC message to each of the respective DCMs 255 in the respective ECUs 230, and in response DCM 255 transmits the accumulated DTCs utilizing the DoIP transport layer of DoIP node 265.

Local security monitor 235 detects intrusion anomalies associated with ECU 230 which are not associated with standard DTCs, as described above. The intrusion anomalies are further detected by analyzing network traffic to and from ECU 230. In one embodiment, messages are parsed and analyzed to detect anomalies. Upon detection of a intrusion anomaly, local security monitor 235 signals DEM 245 with information regarding the detected anomaly. DEM 245, responsive to the signaled detected anomaly, generates a DAC reflecting the detected anomaly and transmits the generated DAC to DCM 255. In one embodiment, DEM 245 generates one of a plurality of DACs, each indicative of a particular potential anomaly that may be detected by local security monitor 235. In another embodiment, a single DAC is provided by DEM 245, with a payload carrying information indicative of the particular anomaly detected by located security monitor 235.

As described above, such intrusion anomalies include, but are not limited to, security and safety anomalies, including statistical anomalies and anomalies detected through machine learning.

Referring now to FIG. 3A, a high level pull mode flow chart is illustrated describing the flow of information from ECU 230 to anomaly analyzer 170. As each hardware event is noted by ECU 230, the event is notified to the respective DEM 245. As each intrusion anomaly is detected by security monitor 185, the anomaly is notified to the respective DEM 245. Periodically, DoIP client 70 of anomaly analyzer 170 requests from ECU 230 all accumulated DACs, and DCM 255 of ECU 230 transmits in response, utilizing DoIP implement by DoIP node 265, all accumulated DACs held by DCM 255. Periodically, DoIP client 70 of anomaly analyzer 170 requests from ECU 230 all accumulated DTCs, and DCM 255 of ECU 230 responds with all accumulated DTCs held by DCM 255 transmitted utilizing DoIP implemented by DoIP node 265. In one embodiment, DoIP client 70 of anomaly analyzer 170 requests from ECU 230 all accumulated DTCs and DACs in a single request. DCM 255 then clears its local memory to accumulated future DACs and DTCs generated by DEM 245. External tester 150 may similarly periodically request from anomaly analyzer 170 all accumulated DACs and DTCs generated by the respective ECUs 30, ECUs 230, network security device 180, TCUs 40 and CAN ECUs 95. Upon transmission of the accumulated DACs and DTCs, anomaly analyzer 170 may optionally clear its associated memory of the transmitted DACs and DTCs. Advantageously, anomaly analyzer 170 is further arranged to analyze the received DACs and DTCs, and in certain conditions take protective action responsive thereto, as described further below.

Referring now to FIG. 3B, a high level push mode flow chart is illustrated describing the flow of information from ECU 230 to anomaly analyzer 170. As each hardware event is noted by ECU 30, the event is notified to the respective DEM 245. As each intrusion anomaly is detected by security monitor 185, the anomaly is notified to the respective DEM 245. Anomaly analyzer 170 generates a command to DCM 255 of ECU 230, which command sets DCM 255 to response on event mode for all reported DACs received from local security monitor 235. Thus, a channel is continuously opened with DoIP node 198, and responsive to the DAC generated by DEM 245, DCM 255 transmits the received DAC to anomaly analyzer. In such an embodiment, DCM 255 may not require a local memory to accumulated future DACs generated by DEM 245, however such local memory may be required to accumulate DTCs from ECU 30. Periodically, DoIP client 70 of anomaly analyzer 170 requests from ECU 230 all accumulated DTCs, and DCM 255 of ECU 230 responds with all accumulated DTCs held by DCM 255 transmitted utilizing DoIP implemented by DoIP node 265. In one embodiment, DoIP client 70 of anomaly analyzer 170 requests from ECU 230 requests all accumulated DTCs and DACs in a single request. DCM 255 then clears its local memory to accumulate future DTCs generated by DEM 245.

External tester 150 may periodically request from anomaly analyzer 170 all accumulated DACs and DTCs generated by the respective ECUs 30, network security device 180, TCUs 40 and CAN ECUs 95. Upon transmission of the accumulated DACs and DTCs, anomaly analyzer 170 may optionally clear its associated memory of the transmitted DACs and DTCs. Additionally, anomaly analyzer 170 is further arranged to be in communication with a remote server via TCU 40, and the remote server may periodically request from anomaly analyzer 170 all accumulated DACs and DTCs generated by the respective ECUs 30, ECUs 230, network security device 180, TCUs 40 and CAN ECUs 95, as described above in relation to FIG. 3C

Figure 4A:
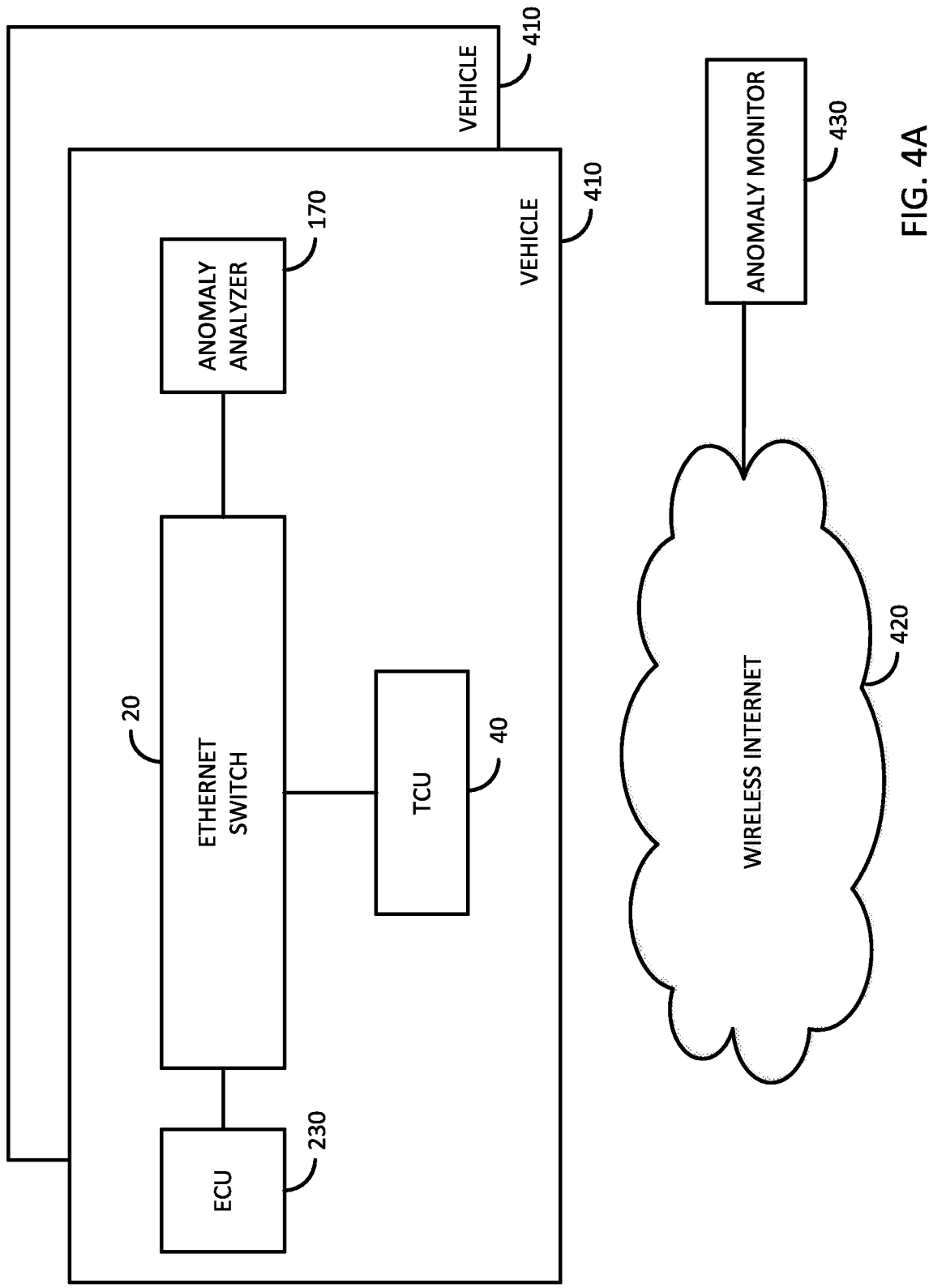
FIG. 4A illustrates a high level block diagram of an arrangement wherein the anomaly analyzer is in communication with an external test equipment via a wireless Internet connection.

FIG. 4A illustrates a high level block diagram of an arrangement wherein anomaly analyzer 170 is in communication with an external anomaly monitor 430 via a wireless Internet connection 420. In particular, a plurality of vehicles are shown, each vehicle 410 comprising: Ethernet switch 20; ECU 230; anomaly analyzer 170; and TCU 40. Each of ECU 230, anomaly analyzer 170 and TCU 40 are in communication with each other through Ethernet switch 20. TCU 40 comprises a wireless data link, which may be implemented by Global System for Communications compatible equipment, EV-DO, W-CDMA, HSPA+, WIMAX, or LTE, without limitation. Anomaly monitor 430 is similar to external test equipment 150, described above, modified to operate over a wireless link comprising wireless Internet connection 420. Anomaly monitor 430 operates as a server, and thus may serve as an external test equipment for a plurality of vehicles 410. Anomaly monitor 430 implements a DoIP tester and thus communicates with anomaly analyzer 170 as described above, and is arranged to retrieve intrusion anomalies from a plurality of anomaly analyzers 170 for remote review and analysis. Furthermore, as indicated above relation to FIG. 3C, anomaly analyzer 170 may after identifying certain anomalies output a warning indicator to a monitor. In the embodiment of FIG. 4A, the monitor is thus implemented remotely by anomaly monitor 430.

Figure 4B:
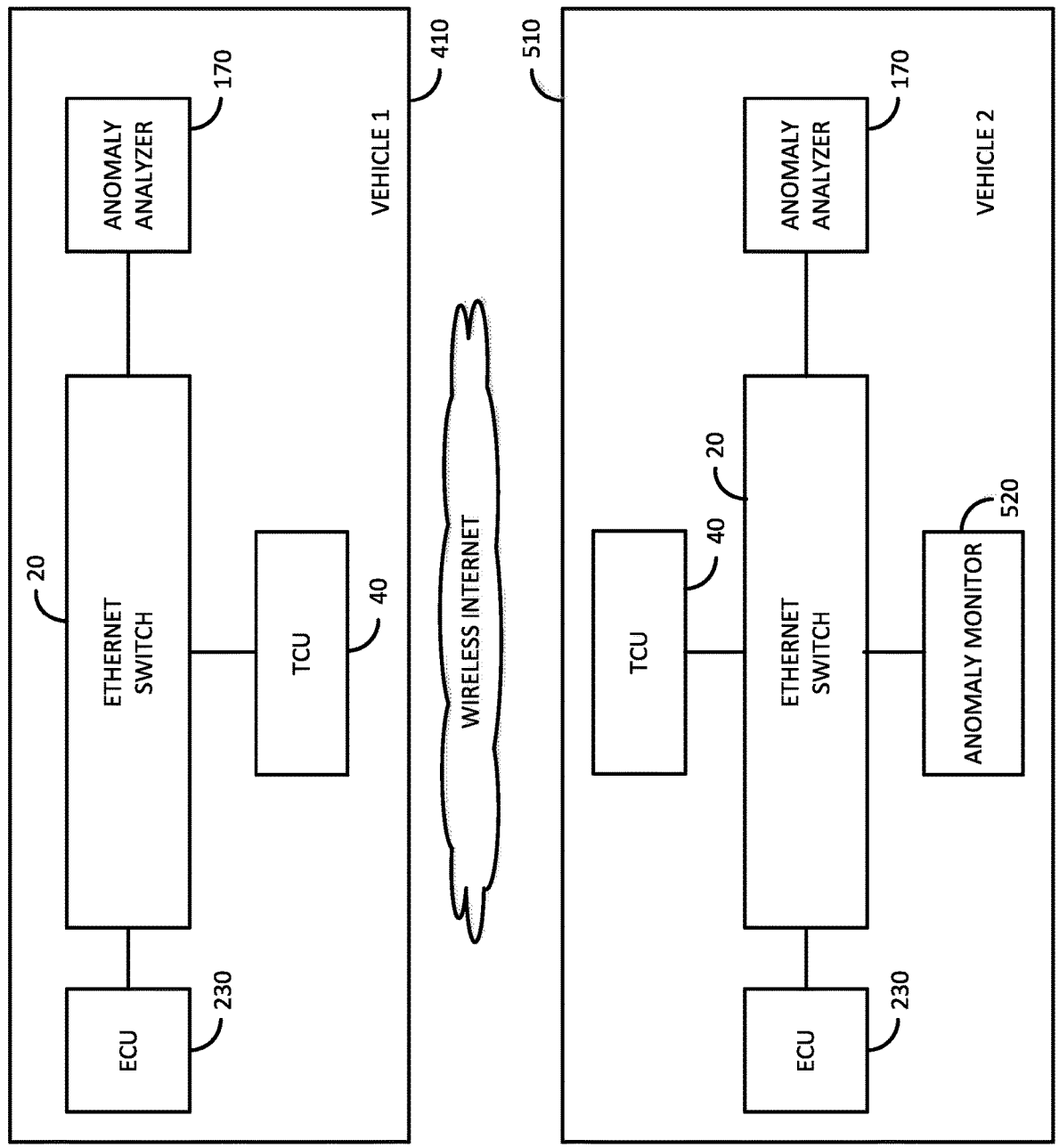
FIG. 4B illustrates a high level block diagram of a multi-vehicle arrangement wherein the anomaly analyzer of a first vehicle is in communication with an anomaly analyzer of a second vehicle.

FIG. 4B illustrates a high level block diagram of a multi-vehicle arrangement 500 wherein anomaly analyzer 170 of first vehicle 410 is communication with an anomaly analyzer 170 of a second vehicle 510. In particular, vehicle 410 is as described above in relation to FIG. 4A, and vehicle 510 comprises: Ethernet switch 20; ECU 235; anomaly analyzer 170; TCU 40; and an anomaly monitor 520. Each of ECU 235, anomaly analyzer 170 and TCU 40 of vehicle 510 are in communication with each other, and with anomaly monitor 520, through Ethernet switch 20 of vehicle 510. In the embodiment of FIG. 4B, the monitor is thus implemented remotely by anomaly monitor 520 located in a different vehicle. In one particular embodiment, a monitoring vehicle of a convoy may implement a single anomaly monitor for all individual vehicles in the convoy, thus allowing supervision of the entire convoy at a single anomaly monitor 520.

Figure 4C:
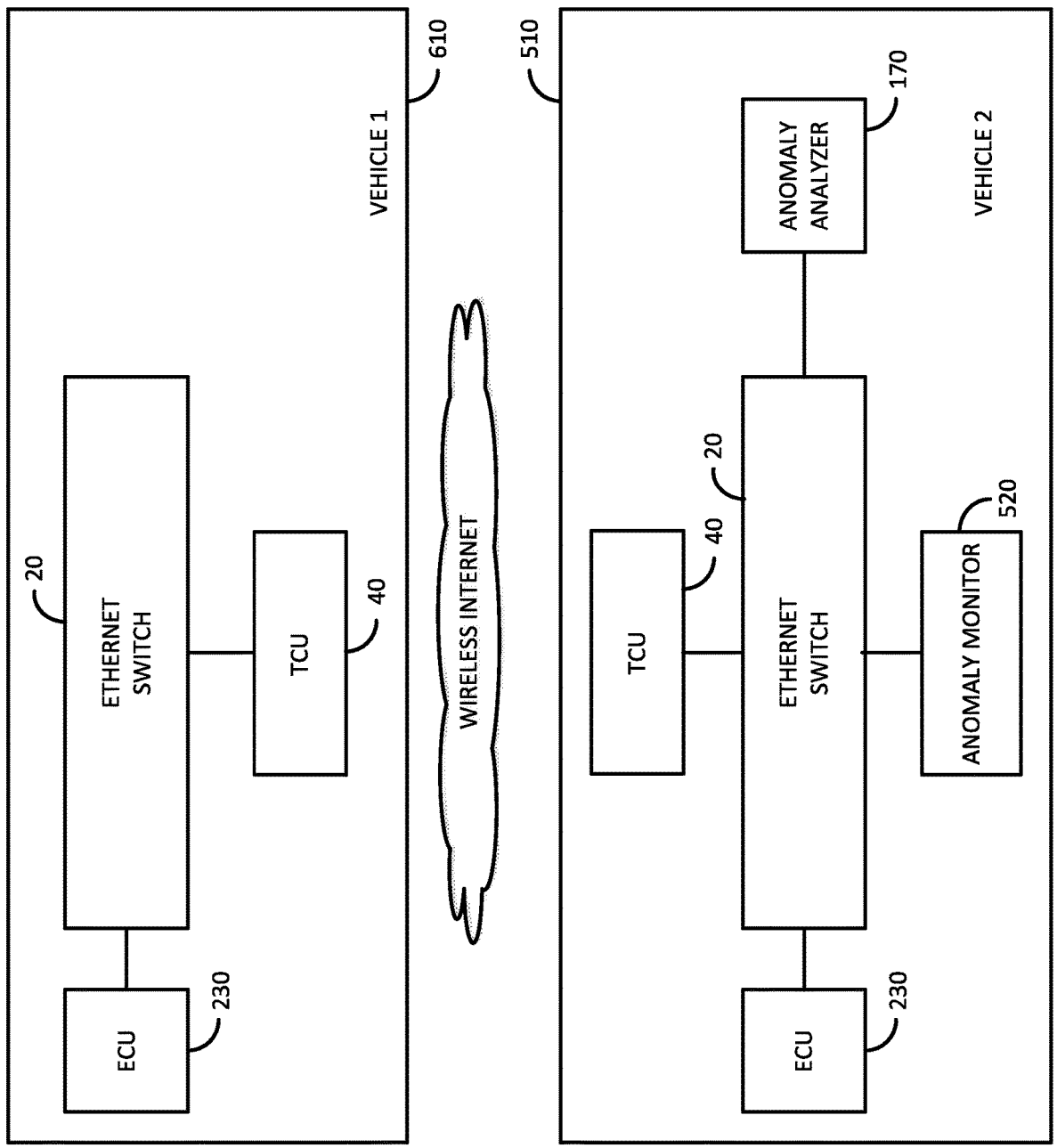
FIG. 4C illustrates a high level block diagram of a multi-vehicle arrangement wherein the anomaly analyzer of a first vehicle is in communication with an ECU of a second vehicle.

FIG. 4C illustrates a high level block diagram of a multi-vehicle arrangement 600 wherein only a first vehicle 510 comprises an anomaly analyzer 170. Particularly, a plurality of vehicles 610 are each in all respects similar to vehicles 410 described above, with the absence of an anomaly analyzer 170 (only one vehicle 610 shown for simplicity). In operation, anomaly analyzer 170 of vehicle 510 queries DoIP nodes of ECUs 230 of vehicles 610 for DTCs and DACs. In one embodiment, the DTCs and DACs of vehicles 610, received by anomaly analyzer 610 of vehicle 510, are further monitored by anomaly monitor 520 along with DTCs and DACs of ECU 230 of vehicle 510.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A system for monitoring intrusion anomalies in an automotive environment, the system comprising:
   a telematic control unit;
   a plurality of electronic control units (ECUs);
   a plurality of local security monitors;
   a plurality of diagnostic communication manager; and
   an anomaly analyzer,
   wherein, each of said plurality of ECUs is associated with a respective one of said plurality of local security monitors, said respective local security monitor arranged to analyze network traffic to and from the associated ECU and detect intrusion anomalies responsive to the analyzed network traffic,
   wherein, for each of said plurality of ECUs, said local security monitor associated therewith is different than said local security monitors associated with the others of said plurality of ECUs,
   wherein, each of said plurality of ECUs is associated with a respective one of said plurality of diagnostic communications managers, said respective diagnostic communication manager arranged to receive information regarding said intrusion anomalies detected by said respective local security monitor,
   wherein, for each of said plurality of ECUs, said diagnostic communication manager associated therewith is different than said diagnostic communication managers associated with the others of said plurality of ECUs,
   wherein said anomaly analyzer is in communication with each of said diagnostic communication managers and said telematics control unit, said communication with each of said diagnostic communication managers and said telematics control unit utilizing a diagnostic over Internet protocol, said anomaly analyzer arranged to:
      receive from the diagnostic communication manager of each of the plurality of ECUs said information regarding intrusion anomalies detected by said respective local security monitors, and
      accumulate said received information on a memory,
   wherein said anomaly analyzer is further arranged to compare the accumulated information regarding intrusion anomalies detected by said local security monitors with a black list.

2. The system of claim 1, wherein in the event that the accumulated information is congruent with the black list, said anomaly analyzer is arranged to output a command to disable a communication function of the telematics control unit.

3. The system of claim 1, wherein each of said plurality of ECUs is within a respective single automotive environment, said anomaly analyzer being within a respective supervisory automotive environment.

4. The system of claim 1, wherein each of said diagnostic communication managers are arranged to report on event, to said anomaly analyzer, said intrusion anomalies identified by said respective security monitor.

5. The system of claim 1, wherein said anomaly analyzer is arranged to periodically poll each of said diagnostic communication managers for said intrusion anomalies identified by said respective security monitor.

6. The system of claim 1, wherein said anomaly analyzer comprises a diagnostic over Internet protocol client, and said plurality of ECUs each comprise a diagnostic over Internet protocol node, for said communication utilizing the diagnostic over Internet protocol.

7. A method of monitoring intrusion anomalies in an automotive environment, the method comprising:
   for each of a plurality of electronic control units (ECUs), analyzing, by a respective one of a plurality of local security monitors associated with the respective one of the plurality of ECUs, network traffic to and from the respective ECU, wherein, for each of the plurality of ECUs, the local security monitor associated therewith is different than said local security monitors associated with the others of the plurality of ECUs;
   for each of the plurality of ECUs, detecting, by the associated one of the plurality of local security monitors, intrusion anomalies responsive to the analyzed network traffic;
   for each of the plurality of ECUs, receiving information, at a respective one of a plurality diagnostic communications managers, associated with the respective ECU, regarding said detected intrusion anomalies, wherein, for each of the plurality of ECUs, the diagnostic communication manager associated therewith is different than the diagnostic communication managers associated with the others of the plurality of ECUs;

for each of the plurality of ECUs, communicating, utilizing a diagnostic over Internet protocol, said received information to an anomaly analyzer;

accumulating on a memory said communicated information regarding said detected intrusion anomalies of said plurality of ECUs; and comparing said accumulated information with a black list.

8. The method of claim 7, further comprising, in the event that said accumulated information is congruent with the black list, outputting a command to disable a communication function of the telematics control unit.

9. The method of claim 7, wherein the accumulation is performed by an anomaly analyzer, wherein each of the plurality of ECUs is within a respective single automotive environment, and said anomaly analyzer is within a respective supervisory automotive environment.

10. The method of claim 7, wherein said detecting intrusion anomalies comprises identifying intrusion anomalies in software packets transmitted to, or from, at least one of the plurality of ECUs.

11. The method of claim 7, further comprising setting each of the diagnostic communication managers to report on event said detected intrusion anomalies.

12. The method of claim 7, further comprising periodically polling each of said diagnostic communication managers for said detected intrusion anomalies.

13. The method of claim 7, further comprising generating a diagnostic anomaly code for each of said detected intrusion anomalies, said received information comprising said generated diagnostic anomaly codes.

14. The method of claim 13, wherein for each type of detected intrusion anomaly said generated diagnostic anomaly code is unique.

15. A system for monitoring intrusion anomalies in an automotive environment, the system comprising:

a plurality of electronic control units (ECUs) arranged as nodes on a network;

a plurality of local security monitors;

a plurality of diagnostic communication manager; and an anomaly analyzer, wherein each of said plurality of ECUs is associated with a respective one of said plurality of local security, monitors, said respective local security monitor arranged to analyze network traffic to and from the associated ECU, wherein, for each of said plurality of ECUs, said local security monitor associated therewith is different than said local security monitors associated with the others of said plurality of ECUs, wherein, each of said plurality of ECUs is associated with a respective one of said of plurality of diagnostic communications managers, said respective diagnostic communication manager, wherein, for each of said plurality of ECUs, said diagnostic communication manager associated therewith is different than said diagnostic communication managers associated with the others of said plurality of ECUs, a network security device comprising a network security monitor arranged to identify intrusion anomalies in software packets transmitted on said network to, or from, at least one of said plurality of ECUs;

wherein said anomaly analyzer is in communication with said network security monitor, said communication utilizing a diagnostic over Internet protocol, said anomaly analyzer arranged to:

receive from said network security device information regarding said detected intrusion anomalies, accumulate on a memory said received information regarding said detected intrusion anomalies, and compare the accumulated information regarding intrusion anomalies detected by said network security device with a black list, and in the event that the accumulated information is congruent with the black list, output:

a command to disable a communication function of the telematics control unit; or an alert message.

16. The system of claim 15, wherein said network security device further comprises a diagnostic communications manager arranged to report on event, to said anomaly analyzer, said information regarding intrusion anomalies detected by said network security monitor.

17. The system of claim 15, wherein said plurality of ECUs each comprise a respective local security monitor and a respective diagnostic communications manager arranged to receive information regarding intrusion anomalies detected by said local security monitor, wherein said anomaly analyzer is further in communication with each of said diagnostic communication managers of said ECUs utilizing the diagnostic over Internet protocol, said anomaly analyzer arranged to accumulate said information regarding intrusion anomalies detected by said respective local security monitors.

18. The system of claim 17, wherein said anomaly analyzer is further arranged to:

compare the accumulated information regarding intrusion anomalies from said diagnostic communication managers of said engine control units with the black list, and in the event that the accumulated information regarding intrusion anomalies from any of said diagnostic communication managers is congruent with the black list, output:

the command to disable a communication function of the telematics control unit; or the alert message.

19. The system of claim 1, wherein in the event that the accumulated information is congruent with the black list, the anomaly analyzer is arranged to output an alert message.

20. The method of claim 7, further comprising, in the event that said accumulated information is congruent with the black list, outputting an alert message.

21. The system of claim 15, wherein in the event that the accumulated information is congruent with the black list, the anomaly analyzer is arranged to output a command to disable a communication function of the telematics control unit.

22. The system of claim 15, wherein in the event that the accumulated information is congruent with the black list, the anomaly analyzer is arranged to output an alert message.

* * * * *